US008014932B2

(12) United States Patent
Nakata et al.

(10) Patent No.: US 8,014,932 B2
(45) Date of Patent: Sep. 6, 2011

(54) FUEL INJECTION CONTROLLER FOR INTERNAL COMBUSTION ENGINE

(75) Inventors: Kenichiro Nakata, Kariya (JP); Koji Ishizuka, Chita-gun (JP); Ru-Long Li, Chiryu (JP)

(73) Assignee: Denso Corporation, Kariya (JP)

( * ) Notice: Subject to any disclaimer, the term of this patent is extended or adjusted under 35 U.S.C. 154(b) by 372 days.

(21) Appl. No.: 12/195,609

(22) Filed: Aug. 21, 2008

(65) Prior Publication Data
US 2009/0063012 A1 Mar. 5, 2009

(30) Foreign Application Priority Data

Aug. 31, 2007 (JP) ................................ 2007-227120

(51) Int. Cl.
*F02D 41/14* (2006.01)
(52) U.S. Cl. .................... 701/104; 123/305; 123/480
(58) Field of Classification Search ................ 701/103, 701/104; 123/305, 478, 480
See application file for complete search history.

(56) References Cited

U.S. PATENT DOCUMENTS

| 6,142,121 | A | 11/2000 | Nishimura et al. | |
|---|---|---|---|---|
| 6,170,459 | B1 | 1/2001 | Ono et al. | |
| 6,729,297 | B2 | 5/2004 | Futonagane et al. | |
| 7,556,023 | B2 * | 7/2009 | Ilhoshi et al. | 123/480 |
| 2002/0112703 | A1 * | 8/2002 | Fujimoto et al. | 123/520 |
| 2003/0233998 | A1 | 12/2003 | Futonagane et al. | |

FOREIGN PATENT DOCUMENTS

| JP | 2000-265892 | 9/2000 |
|---|---|---|
| JP | 2001-317397 | 11/2001 |
| JP | 2004-263669 | 9/2004 |

OTHER PUBLICATIONS

Japanese Office Action dated Jun. 23, 2009, issued in corresponding Japanese Application No. 2007-227120, with English translation.
U.S. Appl. No. 12/194,130, Kenichiro Nakata et al., filed Aug. 19, 2008.
U.S. Appl. No. 12/197,447, Kenichiro Nakata et al., filed Aug. 25, 2008.
U.S. Appl. No. 12/210,409, Koji Ishizuka et al., filed Sep. 15, 2008.
U.S. Appl. No. 12/210,440, Kenichiro Nakata et al., filed Sep. 15, 2008.
U.S. Appl. No. 12/233,800, Kenichiro Nakata et al., filed Sep. 19, 2008.

(Continued)

*Primary Examiner* — Erick Solis
(74) *Attorney, Agent, or Firm* — Nixon & Vanderhye P.C.

(57) ABSTRACT

A common rail type fuel injection system of an engine includes: a common rail for accumulating and holding high-pressure fuel; a fuel pump for pressure-feeding fuel to the common rail; and an injector for injecting the high-pressure fuel accumulated and held in the common rail. A pressure sensor is disposed in a fuel suction port of the injector. An ECU sequentially detects a fuel pressure varied when the injector injects the fuel and sequentially detects a fuel pressure varied when the fuel pump pressure-feeds the fuel. When the injector injects the fuel, the ECU computes injection pressure by the detection values of these pressures and computes injection characteristics by the injector on the basis of the injection pressure.

19 Claims, 8 Drawing Sheets

OTHER PUBLICATIONS

U.S. Appl. No. 12/235,917, Kenichiro Nakata et al., filed Sep. 23, 2008.
U.S. Appl. No. 12/236,882, Koji Ishizuka et al., filed Sep. 24, 2008.
U.S. Appl. No. 12/201,426, Kenichiro Nakata et al., filed Aug. 29, 2008.
U.S. Appl. No. 12/255,936, Koji Ishizuka et al., filed Oct. 22, 2008.
U.S. Appl. No. 12/256,100, Koji Ishizuka et al., filed Oct. 22, 2008.
U.S. Appl. No. 12/258,726, Koji Ishizuka et al., filed Oct. 27, 2008.
U.S. Appl. No. 12/258,750, Koji Ishizuka et al., filed Oct. 27, 2008.
Chinese Office Action dated Mar. 24, 2010, issued in corresponding Chinese Application No. 200810211154.X, with English translation.
U.S. Appl. No. 11/930,668 of Ishizuka, filed Oct. 31, 2007.
U.S. Appl. No. 12/179,235 of Ishizuka, filed Jul. 24, 2008.
U.S. Appl. No. 12/186,038 of Nakata, filed Aug. 5, 2008.
U.S. Appl. No. 12/187,638 of Nakata, filed Aug. 7, 2008.
U.S. Appl. No. 12/189,376 of Nakata, filed Aug. 11, 2008.
U.S. Appl. No. 12/194,917 of Nakata filed Aug. 20, 2008.

* cited by examiner

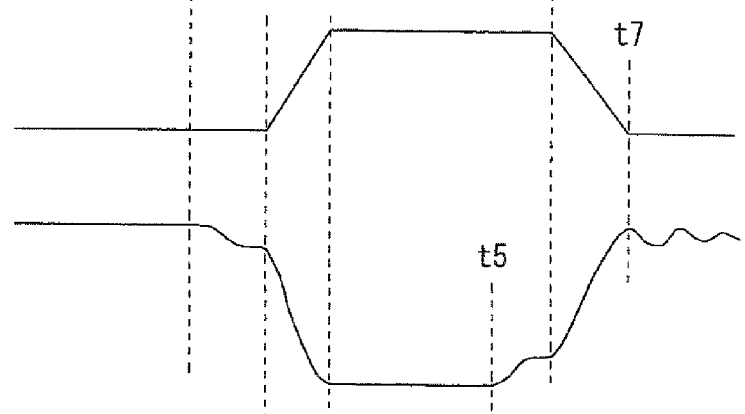
FIG. 5A INJECTION COMMAND SIGNAL
FIG. 5B INJECTION RATE
FIG. 5C INLET PRESSURE (NO DELAY)
FIG. 5D INLET PRESSURE (WITH DELAY)
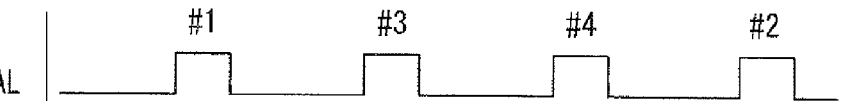
FIG. 6
INJECTION COMMAND SIGNAL
PUMP FEEDING
FUEL PRESSURE

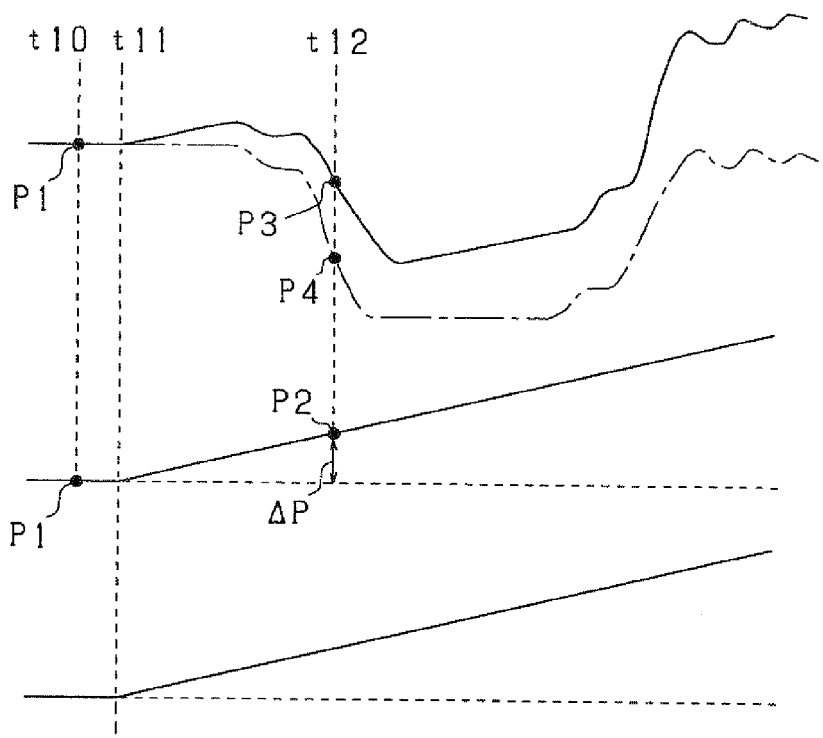

US 8,014,932 B2

FUEL INJECTION CONTROLLER FOR INTERNAL COMBUSTION ENGINE

CROSS-REFERENCE TO RELATED APPLICATION

This application is based on Japanese Patent Application No. 2007-227120 filed on Aug. 31, 2007, the disclosure of which is incorporated herein by reference.

FIELD OF THE INVENTION

The present invention relates to a fuel injection controller for an internal combustion engine, which is applied to an accumulator type fuel injection system for performing fuel injection by use of high-pressure fuel accumulated in the accumulator of a common rail or the like.

BACKGROUND OF THE INVENTION

An apparatus described in JP-10-220272A (U.S. Pat. No. 6,142,121) is proposed as an apparatus of this kind, In a common rail type fuel injection system constructed of this fuel injection apparatus, fuel pressure-fed from a fuel pump is accumulated in a high-pressure state by a common rail. Then, the accumulated high-pressure fuel is supplied to the fuel injection valve of each cylinder through pipes (high-pressure fuel passage) disposed for each cylinder. The common rail is provided with a specified pressure sensor (rail pressure sensor). This system is constructed in such a way as to control the driving of various devices constructing a fuel supply system on the basis of the output of the sensor from this rail pressure sensor.

In recent years, the need for improving exhaust emission is increasing more and more in a diesel engine for an automobile. A study has been conducted in which injection characteristics including the timing of starting/finishing fuel injection and an injection rate are estimated to control the driving of the fuel injector by use of the estimation result. In this case, the pressure in the common rail (rail pressure) is measured by a rail pressure sensor disposed in the common rail and the injection characteristics are estimated on the basis of a change in the rail pressure.

However, according to the findings of the inventors of this application, when fuel is injected, a variation is developed in the rail pressure but the variation in the rail pressure is very little, so that it is thought that the variation in the rail pressure cannot be effectively used for estimating the injection characteristics with high accuracy. In other words, a pressure variation caused by an injection action is damped before the pressure variation reaches the common rail from the fuel injection port (injection opening) of the fuel injector and hence does not cause a variation in the rail pressure. Hence, there is a room for improvement as a technology for estimating injection characteristics.

SUMMARY OF THE INVENTION

The present invention has been made in view of these circumstances. An object of the present invention is to provide a fuel injection controller which is applied to an accumulator type fuel injection system and which can find the injection characteristics of a fuel injector with high accuracy.

A fuel injection controller is applied to an accumulator type fuel injection system including an accumulation container (common rail) for accumulating and holding high-pressure fuel, a fuel pump for pressure-feeding fuel to the accumulation container, and a fuel injector for injecting the high-pressure fuel accumulated in the accumulation container.

In the present invention, the fuel injection controller includes: first pressure detecting means that sequentially detects a fuel pressure varied when the fuel injector injects the fuel; second pressure detecting means that sequentially detects a fuel pressure varied when the fuel pump pressure-feeds the fuel; injection pressure computing means that corrects a detection value of the first pressure detecting means by a detection value of the second pressure detecting means when the fuel injector injects the fuel, thereby computing an injection pressure; and injection characteristic computing means that computes an injection characteristic of the fuel injector on the basis of the injection pressure computed by the injection pressure computing means.

In short, when the fuel injector injects the fuel, a fuel pressure transition waveform in a fuel injection process can be found by sequentially detecting a variation in the fuel pressure, and the injection characteristics of the fuel injector such as an actual injection starting point, an actual injection finishing point, and an injection rate can be found by the fuel pressure transition waveform. However, in this case, when the fuel is pressure-fed to the accumulation container by the fuel pump, if the pressure-feeding of the fuel by the fuel pump and the injecting of the fuel by the fuel injector are performed at the same time, it can be thought that a variation in the fuel pressure caused when the fuel injector injects the fuel cannot be correctly detected. According to the present invention, the fuel pressure varied when the fuel pump pressure-feeds the fuel is sequentially detected, and the fuel pressure varied when the fuel injector injects the fuel is corrected by this detected fuel pressure (variation in the fuel pressure caused when the fuel pump pressure-feeds the fuel), and the injection pressure is computed. For this reason, an actual pressure variation due to the fuel injection (pressure transition waveform) can be correctly found as the injection pressure in a state where the effect produced when the fuel pump pressure-feeds the fuel is eliminated. Hence, the injection characteristics of the fuel injector can be found with high accuracy on the basis of the injection pressure.

According to another aspect of the present invention, a fuel injection controller includes: injection cylinder pressure detecting means that sequentially detects a fuel pressure varied when the fuel injector injects the fuel in an injection cylinder; non-injection cylinder pressure detecting means that sequentially detects a fuel pressure having no variation or a little variation caused when the fuel pump pressure-feeds the fuel in a non-injection cylinder that is not the injection cylinder; and injection characteristic computing means that computes an injection characteristic by the fuel injector on the basis of pressure variation data that is a difference between the fuel pressure detected by the injection cylinder pressure detecting means and the fuel pressure detected by the non-injection cylinder pressure detecting means.

When the injecting of the fuel by the fuel injector and the pressure-feeding of the fuel by the fuel pump are performed at the same time, in the injection cylinder, the fuel pressure is varied by the effect of the injecting of the fuel and the pressure-feeding of the fuel, but in the non-injection cylinder, the fuel pressure is varied only by the effect of the pressure-feeding of the fuel (even if the injecting of the fuel causes a variation in the fuel pressure, the variation is very little). Thus, when the difference between the fuel pressure in the injection cylinder and the fuel pressure in the non-injection cylinder is used, fuel pressure variation data reflecting the injection characteristics by the fuel injector can be obtained. As a result, the injection characteristics of the fuel injector can be found with high accuracy.

BRIEF DESCRIPTION OF THE DRAWINGS

Other objects, features and advantages of the present invention will become more apparent from the following description made with reference to the accompanying drawings in which like parts are designated by like reference numbers and in which:

FIGS. 5A-5D are time charts to show the transitions of injection parameters;

FIG. 6 is a time chart to show a relationship between the timing when an injector injects fuel and the timing when a fuel pump pressure-feeds the fuel;

FIGS. 7A-7E are time charts to show the transitions of injection parameters;

DETAILED DESCRIPTION OF EMBODIMENTS

First Embodiment

Hereinafter, a first embodiment that embodies the present invention will be described with reference to the drawings. An apparatus of this embodiment is mounted in, for example, a common rail type fuel injection system (system for supplying fuel injected at high pressure) in which a reciprocating diesel engine as an engine for an automobile is controlled. That is, this apparatus is used as an apparatus for injecting and supplying high-pressure fuel (for example, light oil having an injection pressure of about "1400 atm") directly into the combustion chamber of a cylinder of a diesel engine (internal combustion engine).

Figure 1:
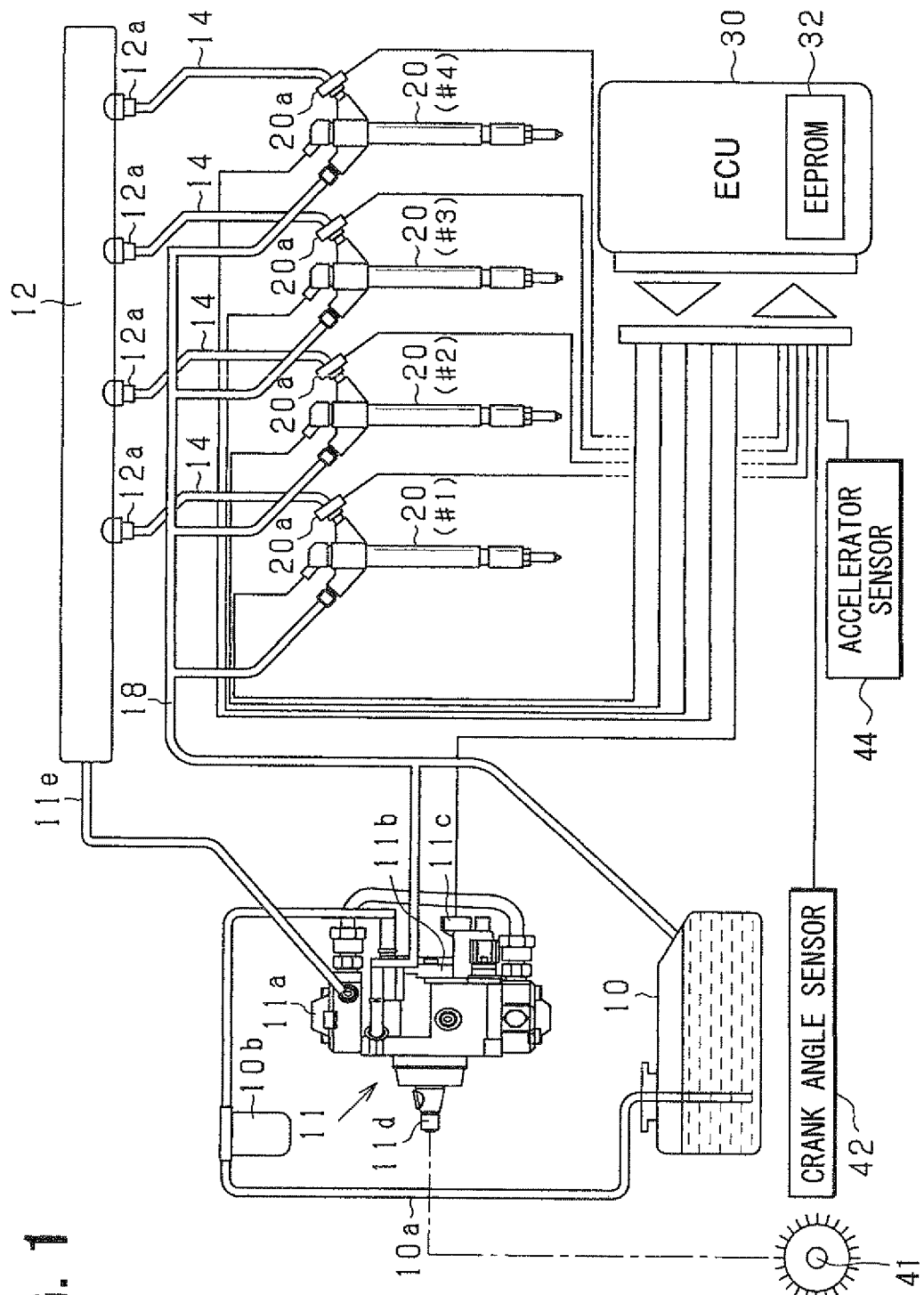
FIG. 1 is a construction diagram to show an outline of a common rail type fuel injection system in an embodiment of the invention.

The outline of the common rail type fuel injection system according to this embodiment will be described with reference to FIG. 1. A multi-cylinder engine (for example, 4 cylinder engine) for a 4-wheel automobile is assumed as the engine of this embodiment. In FIG. 1, respective injectors 20 are fitted in first to fourth cylinders (#1, #2, #3, and #4).

As shown in FIG. 1, this system is constructed in such a way that an ECU (electronic control unit) 30 receives sensor outputs (detection results) from various sensors and controls the driving of a fuel supply apparatus on the basis of these respective sensor outputs. In order to control the output (revolution speed or torque) of a diesel engine, for example, the ECU 30 controls various devices constructing a fuel supply system to feed back a fuel injection pressure for the engine (in this embodiment, fuel pressure of the time measured by a pressure sensor 20a) to a target value (target fuel pressure).

The various devices constructing the fuel supply system include a fuel tank 10, a fuel pump 11, and a common rail 12 (accumulation container), which are arranged in this order from the upstream side of fuel flow. The fuel tank 10 and the fuel pump 11 are connected to each other by piping 10a via a fuel filter 10b.

The fuel tank 10 is a tank (container) for storing the fuel (light oil) of a target engine. The fuel pump 11 includes a low-pressure pump 11a and a high-pressure pump 11b and is constructed in such a way that the fuel suctioned from the fuel tank 10 by the low-pressure pump 11a is pressurized and discharged by the high-pressure pump 11b. The quantity of fuel pressure-fed to the high-pressure pump 11b, that is, the quantity of fuel discharged by the fuel pump 11 is controlled by a suction control valve (SCV) 11c disposed on the fuel suction side of the fuel pump 11. In other words, the driving current of the SCV 11c is adjusted to control the quantity of discharge of the fuel from the fuel pump 11 to a desired value. The SCV 11c is a normally open valve that is opened when the current is not passed.

The low-pressure pump 11a is constructed, for example, as a trochoidal feed pump. The high-pressure pump 11b is constructed, for example, of a plunger pump and is constructed in such a way that a specified number of plungers (for example, 2 or 3 plungers) are reciprocated respectively in an axial direction by an eccentric cam (not shown) to pressure-feed the fuel in a pressuring chamber at specified timing sequentially. Both pumps are driven by a drive shaft 11d. The drive shaft 11d is rotated in association with a crankshaft 41 of the engine and is rotated, for example, at a ratio of 1/1 or 1/2 with respect to one rotation of the crankshaft 41. That is, the low-pressure pump 11a and the high-pressure pump 11b are driven by the output of the engine.

The fuel in the fuel tank 10 is suctioned by the fuel pump 11 via a fuel filter 10b and is pressurized and fed (pressure-fed) to the common rail 12 through a piping (high-pressure fuel passage) 11e. The fuel pressure-fed from the fuel pump 11 is accumulated in the common rail 12, and the accumulated high-pressure fuel is supplied to the injector 20 of each cylinder through piping (high-pressure fuel passages) 14 disposed for each cylinder. An orifice (a throttling part of the piping 14, which corresponds to fuel pulsation reducing means) for reducing the pulsation of the fuel propagated to the common rail 12 through the piping 14 is disposed in the connection part 12a of the common rail 12 and the piping 14, whereby the pulsation of pressure in the common rail 12 is reduced and hence the fuel can be supplied to each injector 20 at a stable pressure. The pulsation of the fuel occurs at the fuel injection port of the injector 20 mainly at the time of injecting the fuel. As for the fuel pulsation reducing means, in addition to the orifice, a flow damper and a combination of the orifice and the flow damper can be applied.

In this system, the fuel pressure-fed by driving the fuel pump 11 is directly injected and supplied into the each cylinder (combustion chamber) of the engine by each injector 20. This engine is a 4-stroke engine. That is, one combustion cycle including 4 strokes of intake, compression, power, and exhaust is performed in sequence at a cycle of "720° C.A."

In the fuel injection apparatus according to this embodiment, a pressure sensor 20a (fuel pressure sensor) is disposed near the injector 20 of each of the cylinders (#1 to #4), in particular, at the fuel suction port of the injector 20. The state of pressure variations caused by the injection action or the actual injection of the injector 20 can be detected with high accuracy (this will be later described in detail).

Figure 2:
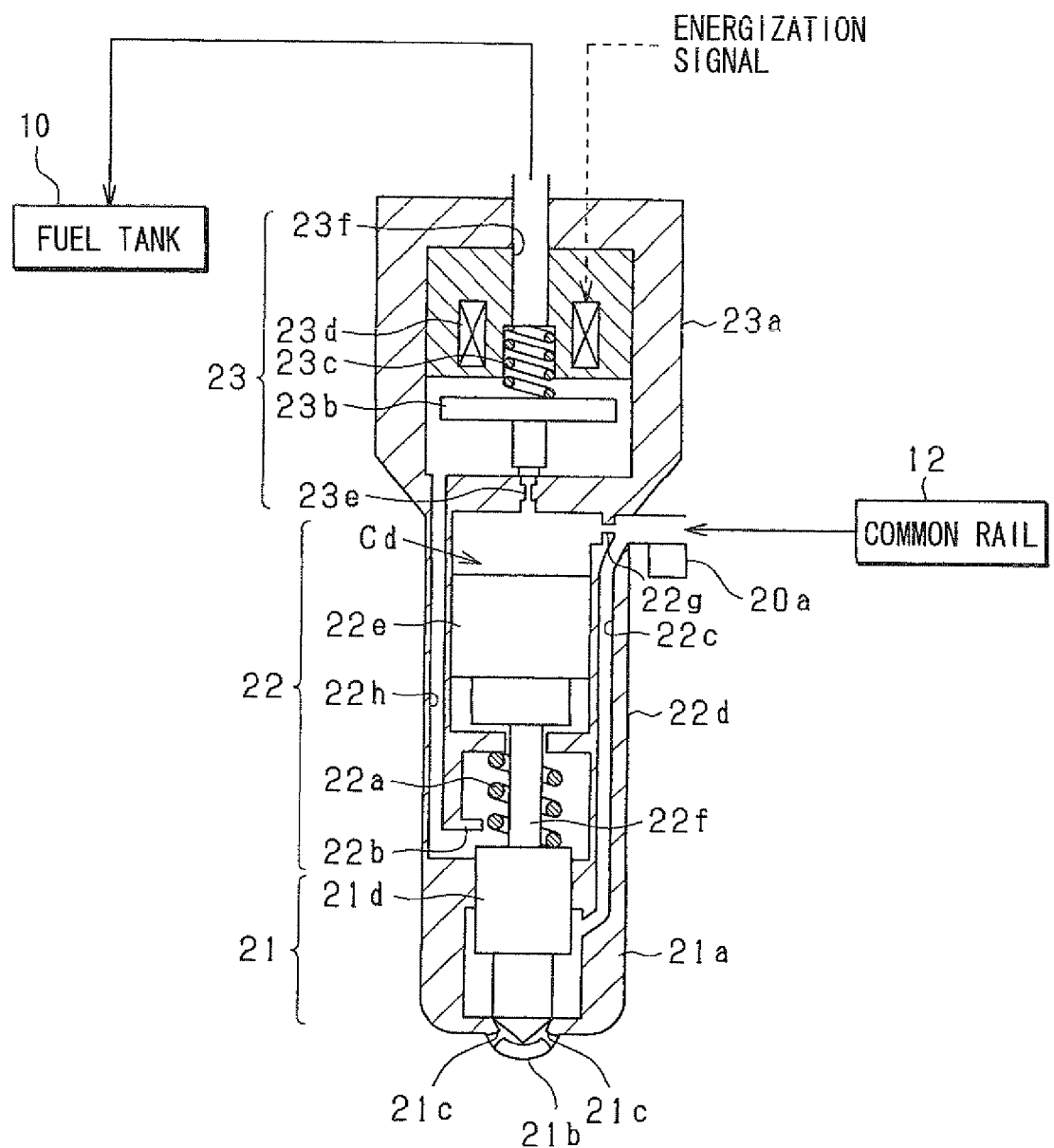
FIG. 2 is an internal side view to schematically show an internal structure of an injector.

The structure of the injector 20 will be described in detail with reference to FIG. 2. FIG. 2 is an internal side view schematically showing the internal structure of the injector 20.

As shown in FIG. 2, the injector 20 is constructed of a nozzle pad (injection part) 21, which is a part for injecting the fuel to the outside of the valve through the fuel injection port, and a driving part 23 for driving a valve. The nozzle part 21 and the driving part 23 are arranged respectively on the tip end side and the rear end side of a valve body part 22. The nozzle part 21 is formed of, for example, a separate nozzle fitted in the tip of the valve body part 22.

The fuel injection port 21 (injection opening 21c) of the injector 20 is formed in the nozzle part 21 on the tip end side of the valve. The nozzle part 21 is mainly constructed of a nozzle body 21a having its outside shape formed in a cylinder, and the nozzle body 21a has its diameter reduced toward its tip and has a tip end portion 21b formed at its extreme tip. The tip end portion 21b has a necessary number (for example, 6 to 8) of injection openings 21c (small holes) formed therein as the fuel injection ports to connect the inside and the outside of the valve. The nozzle part 21 has a cylindrical nozzle needle 21d housed therein. The nozzle needle 21d opening or closing a fuel passage is connected to the injection openings 21c. The nozzle needle 21d is biased to the valve tip end side by a spring 22a disposed on the valve rear end side and is slid in the axial direction in the injector 20 by or against the biasing force of the spring 22a. In order to prevent an abnormal action, a stopper 22b is disposed on the valve rear end side (lift side) of the needle 21d.

The high-pressure fuel is fed to the tip end portion 21b of the nozzle part 21 from the common rail (accumulator piping) 12 through the piping 14 (FIG. 1) and a fuel passage 22c. The fuel is injected through the injection openings 21c. The fuel pressure of the high-pressure fuel is measured at the fuel suction port of the injector 20. Describing in more detail, the pressure value (inlet pressure) that includes the state of pressure variation caused by the injection action or the actual injection (actual fuel injection) of the injector 20 is measured in sequence by the pressure sensor 20a disposed at the fuel suction port. When the fuel is injected, the quantity of fuel to be supplied to the injection openings 21c and the quantity of fuel per unit time to be injected from the injection openings 21c (injection rate) can be changed according to the magnitude of the quantity of upward displacement (lift quantity) in the axial direction of the needle 21d. For example, in the state where the needle 21d is seated (lift quantity="0"), the fuel injection is stopped.

Next, the internal structure of the valve body part 22 will be described.

The valve body part 22 has a command piston 22e disposed in the housing 22d forming the cylindrical outside shape of the valve body part 22. The command piston 22e is moved in association with the nozzle needle 21d. The command piston 22e is formed in the shape of a cylinder having a larger diameter than the nozzle needle 21d and is connected to the needle 21d via a pressure pin 22f (connection shaft). The command piston 22e is also slid in the injector 20 in the axial direction in the same way as the nozzle needle 21d. A command chamber Cd partitioned by the wall surface of the housing and the top surface of the command piston 22e is formed on the valve rear end side of the command piston 22e. Further, an inlet orifice 22g as a fuel inflow port is formed in the command chamber Cd. That is, the high-pressure fuel from the common rail 12 flows into the command chamber Cd through the inlet orifice 22g. In a space below the command piston 22e, a leak passage 22h for making the space connect to a specified space of the driving part 23 (in detail, a leak space made to connect to the fuel tank 10 when a solenoid valve is opened or closed) is formed. In the injector 20, the leak passage 22h is formed to return the extra fuel below the command piston 22e (leak fuel or the like from the portion in which the nozzle needle 21d is slid) to the fuel tank 10.

The driving part 23 is positioned closer to the rear end side of the valve body part 22. The driving part 23 is mainly constructed of a housing 23a having a cylindrical outside shape and has a two-way solenoid valve (TWV) in the housing 23a. Describing in detail, the two-way solenoid valve is constructed of an outer valve 23b, a spring 23c (coil spring), and a solenoid 23d. The two-way solenoid valve opens or closes an outlet orifice 23e as a fuel outflow port by the action of the outer valve 23b. That is, in the state where current is not passed through the solenoid 23, the two-way solenoid valve is biased to a side in which the outer valve 23b closes the outlet orifice 23e by the extension force of the spring 23 (extension force along the axial direction). When current is passed through the solenoid valve 23d (the solenoid 23d is magnetized), the outer valve 23b is attracted by the magnetic force of the solenoid 23d against the extension force of the spring 23c, thereby being displaced to a side to open the outlet orifice 23e. On the rear end side of the driving part 23, so as to return the fuel in the housing 23a, there is formed a cylindrical return opening 23f (fuel return port). That is, in the injector 20, the return opening 23f is made to connect to the fuel tank 10 through piping 18 (see FIG. 1). A circuit for controlling the passing of current through the driving part 23 and a program for performing the injection control through the circuit are mounted in the ECU 30.

That is, the ECU 30 controls the current through the two-way solenoid valve by binary values (through a driving pulse) to make the nozzle needle 21d perform a lift action according to a current passing time, thereby injecting the high-pressure fuel, which is sequentially supplied to the tip end portion 21b through the fuel passage 22c from the common rail 12, through the injection openings 21c.

Describing in more detail, when the two-way solenoid valve (strictly speaking, the solenoid 23d) is in the state where current is not passed (OFF state), the outer valve 23b is moved down to the valve tip end side to close the outlet orifice 23e. When the high-pressure fuel is supplied to the tip end portion 21b and the command chamber Cd from the common rail 12 through the fuel passage 22c and the inlet orifice 22g in this state, the command piston 22e having a diameter larger than the diameter of the lower portion of the nozzle needle 21d has a force applied to the valve tip end side on the basis of difference in a pressure receiving area. With this, the command piston 22e is pressed down to the valve tip end side, and the nozzle needle 21d biased to the valve tip end side by the spring 22a shuts the fuel supply passage (the nozzle needle 21d is brought into a seated state). For this reason, when the current is not passed, the fuel is not injected (normally closed). The extra fuel below the command piston 22e is returned to the fuel tank 10 through the leak passage 22h and the return opening 23f.

When the current is passed (ON), the outer valve 23b is attracted to the valve tip end side by the magnetic force of the solenoid 23d to open the outlet orifice 23e. When the output orifice 23e is opened, the fuel in the command chamber Cd flows out to the fuel tank 10 and the lower side of the command piston 22e through the outlet orifice 23e, the return opening 23f, and the leak passage 22h. When the fuel flows out, the pressure in the command chamber Cd and the force to press down the command piston 22e are made smaller. With this, the command piston 22e is pressed up to the valve rear end side along with the nozzle needle 21d integrally connected thereto. When the nozzle needle 21d is pressed up (lifted), the nozzle needle 21d is separated from its seat to open the fuel supply passage to the injection openings 21c, whereby the high-pressure fuel is supplied to the injection openings 21c and is injected and supplied to the combustion chamber of the engine through the injection openings 21c.

In the injector 20, the passage area of the fuel supply passage to the injection openings 21c can be varied according to the lift quantity of the nozzle needle 21d, and an injection rate can be also varied according to this passage area. In this case, by variably controlling a parameter (current passing time or fuel pressure) relating to the action of lifting the nozzle needle 21d, the injection rate and the injection quantity can be controlled.

Hereinafter, the construction of the system will be further described again with reference to FIG. 1.

That is, in this system, a vehicle (not shown) is mounted with various sensors for vehicle control. For example, a crankshaft 41 that is the output shaft of the engine is provided with a crank angle sensor 42 for outputting a crank angle signal at intervals of a specified crank angle (for example, at intervals of 30° C.A) so as to detect the rotational angle position and the rotation speed of the crankshaft 41. An accelerator pedal (not shown) is mounted with an accelerator sensor 44 for outputting an electric signal according to the state (quantity of displacement) of the accelerator pedal so as to detect the quantity of operation of the accelerator pedal (the degree of opening of the accelerator) by a driver.

The ECU 30 performs the engine control in this system. The ECU 30 is constructed of a well-known microcomputer (not shown) and grasps the operating state of the engine and user's request on the basis of the detection signal of various sensors and operates various actuators such as the injector 20. The microcomputer mounted in the ECU 30 is basically constructed of various operation devices, storage devices, and communication devices including: a CPU (basic processing unit) for performing various operations; a Random Access Memory (RAM) as a main memory for temporarily storing data in the middle of operation and operation results; a Read-Only Memory (ROM) as a program memory; an EEPROM (electrically writable non-volatile memory) as a data storage memory (backup memory) 32; a backup RAM (RAM to which electric power is supplied from a backup power source such as a vehicle-mounted battery); and input/output ports for inputting/outputting a signal to/from the outside. The ROM has various programs and control maps relating to the engine control including a program relating to the learning of the fuel pressure previously stored therein, and the memory for storing data (for example, EEPROM 32) has various control data, including the design data of the engine, stored therein.

Figure 3:
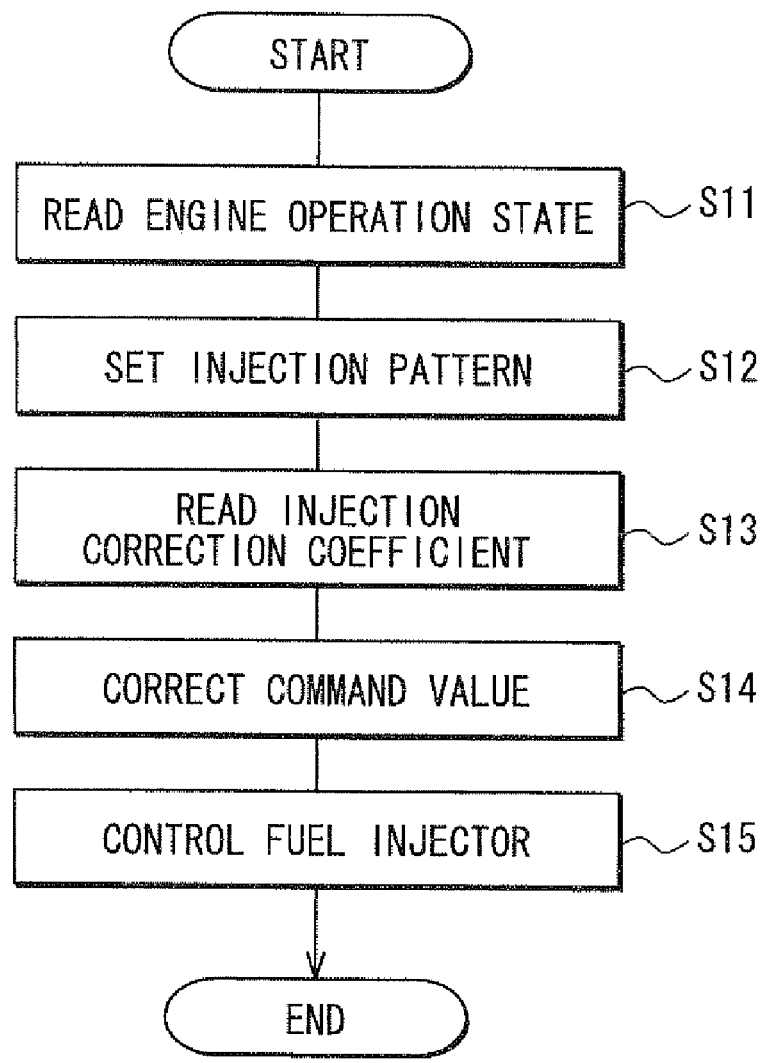
FIG. 3 is a flow chart to show a basic procedure of a fuel injection control processing.

In the system according to this embodiment, an injection correction coefficient and the like according to the state at each time are sequentially learned (updated). With this, a control error caused, for example, by individual differences and secular changes in parts (in particular, the injector 20) used for the system are sequentially corrected (fed back for correction). Hereinafter, the basic procedure of the fuel injection control according to this embodiment will be described with reference to FIG. 3. The values of various parameters used in this processing shown in FIG. 3 are stored as required in the storage devices such as the RAM, the EEPROM 32, or the backup RAM mounted in the ECU 30 and are updated at any time as required. Basically, when the program stored in the ROM is executed by the ECU 30, a series of processing shown in the respective drawings is sequentially performed for the respective cylinders of the engine at intervals of a specified crank angle or at intervals of a specified time.

As shown in FIG. 3, in this series of processing, first, in step S11, various parameters showing the operating state of the engine such as the engine rotation speed (average rotation speed) and the engine load are read. Then, in the subsequent step S12, an injection pattern is set on the basis of the operating state of the engine read in the step S11 and the quantity of operation of the accelerator pedal inputted by the driver (when necessary, by separately computing the required operating state of the engine).

This injection pattern is acquired on the basis of a specified map stored and held, for example, in the ROM (can be also acquired by a mathematical equation). Describing in more detail, optimal patterns (suitable values) are found in advance for the respective assumed operating states of the engine by experiment or the like and are written to the map. The map shows the relationship between the operating states of the engine and the optimal patterns.

Moreover, the injection pattern is determined by parameters, for example, the number of injection steps (the number of injections), injection timing, injection time, injection interval (injection interval in the case of multi-step injection). In the step S12, the optimal pattern (suitable value) is set by the map so as to satisfy the required operating state of the engine according to the operating state of the engine at that time (acquired in the step S11). For example, in the case of single-step injection, the injection quantity (injection time) is varied according to a required torque or the like, and in the case of the multiple-step injection, the total sum of injection quantities of the respective injections are varied according to the required torque or the like. A command value (command signal) for the injector 20 is set on the basis of the injection pattern. With this, pre-injection, pilot-injection, after-injection, or post-injection is performed appropriately along with main injection according to the state of the vehicle or the like.

In the subsequent step S13, the injection correction coefficient updated separately by the learning processing is read from the EEPROM 32 or the like, and in the subsequent step S14, a command value (command signal) for the injector 20 is corrected on the basis of the read injection correction coefficient. Then, in the subsequent step S15, the command values relating to the number of steps of injection, the injection timing, the injection time, and the injection interval are determined on the basis of the corrected command values (command signals), and the driving of the injector 20 is controlled on the basis of the respective command values.

Figure 4:
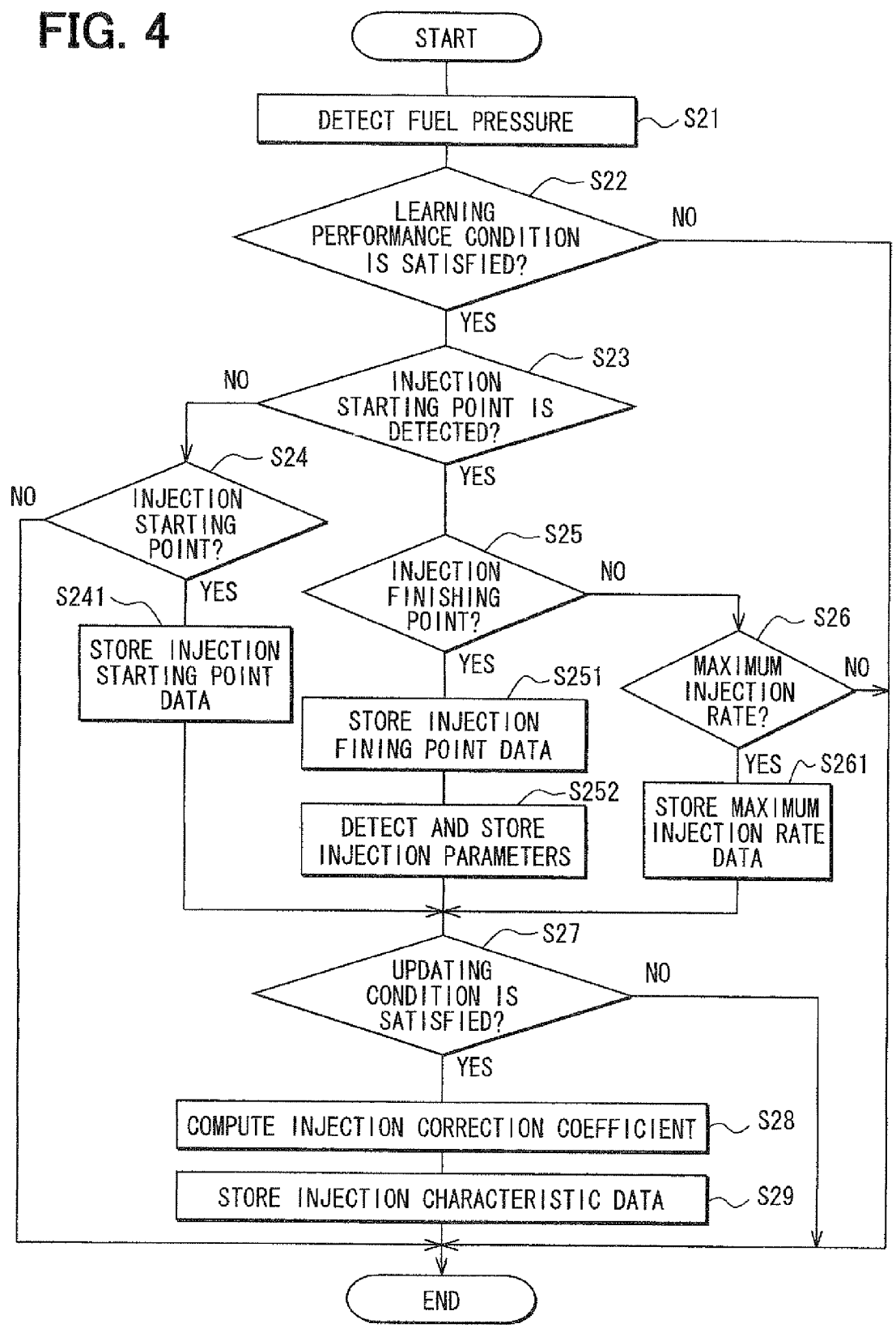
FIG. 4 is a flow chart to show the processing contents of a learning processing.

Next, with reference to FIG. 4 and FIGS. 5A-5D, the mode of learning (updating) the injection correction coefficient and other injection characteristic data used in the step S14 will be described in detail. The values of various parameters used in the series of processing shown in FIG. 4 is also stored as required in the storage devices, for example, the RAM, the EEPROM 32, or the backup RAM mounted in the ECU 30 and are updated at any time as required. The series of processing shown in FIG. 4 is basically performed in sequence by the ECU 30 according to the program stored in the ROM at intervals of a specified crank angle or at intervals of a specified time (an interval of "20 μsec" is employed in this embodiment).

The specific mode of the pressure variation caused by the injection action and the actual fuel injection of the injector 20 will be described with reference to FIGS. 5A-5D. FIGS. 5A-5D are timing charts to show pressure transition near the injection timing of the injection to be learned, FIGS. 5A-5D are timing charts with respect to a single injection. FIG. 5A shows a transition of an injection command signal (pulse signal) for the injector 20. FIG. 5B shows a transition of an injection ratio (fuel quantity injected per unit time) of the injection to be learned. FIGS. 5C and 5D show transitions of the fuel pressures (inlet pressures) detected by the pressure sensor 20a.

When the fuel is injected from the injection openings 21c of the injector 20 with the rise of the injection command signal, the injection rate is transited in accordance with the fuel injection and a pressure drop is developed in the fuel openings 21c in accordance with the fuel injection. However, the pressure sensor 20a for detecting the pressure drop is fitted at a position separate from the injection openings 21c (at the fuel suction port), so that the inlet pressure is varied after some delay from the transition of the injection ratio by the fuel injection (pressure drop at the injection openings 21c). This is the pressure transition shown in FIG. 5D. In other words, the inlet pressure develops a pressure propagation delay due to the position where the pressure sensor 20a is fitted, and "TD" shown in FIG. 5D corresponds to a delay time caused by the pressure propagation. However, this pressure propagation delay is not directly related to the substantial portion of this embodiment. Thus, for the same of convenience, in the following description, it is assumed that the pressure propagation delay is not developed as shown in FIG. 5C. In other words, it is assumed that the injection rate and the inlet pressure are varied at the same time. If it is assumed that the pressure sensor 20a is fitted near the injection openings of the injector 20, the pressure propagation delay is not developed (or becomes extremely small), and the transition of the detection value (inlet pressure) becomes the graph shown in FIG. 5C.

In FIGS. 5A-5C, when the injection command signal is made to rise at timing t1, the pressure transition (pressure transition waveform) immediately after the start of driving the injector 20 shows the following tendency: that is, first, there is a short period in which the pressure is not varied; after the period, the pressure starts to drop gradually; and then the pressure starts to drop sharply at certain timing.

An initial period in which the pressure does not vary and the subsequent period in which the pressure drops gradually (period from t1 to t2 in the drawing) correspond to an ineffective injection period of the injector 20. Describing in more detail, the ineffective injection period is the total sum of various delays including: a delay from the start of passing current (the rise of an injection command pulse) to the formation of normal magnetic field by the solenoid 23d; a delay in action caused by the inertias of the outer valve 23b and the nozzle needle 21d, the inertia of the fuel, and the friction between the nozzle needle 21d and the internal wall surface of the nozzle; and the other delays. In other words, the ineffective injection period corresponds to the time that passes after the driving of (the passing of current through) the injector 20 is started until the fuel is actually injected or until the nozzle needle 21d starts a lift action. Moreover, in this ineffective injection period, after the period in which the pressure does not vary, the pressure drops gradually. This shows that a pressure leak is developed by the injection action of the injector 20. Describing in detail, this is caused by the fact that the injector 20 is an injection valve of the type to cause a pressure leak in the period of time that passes after the injection valve starts an action relating to injection until the injection valve starts actual injection. Specifically, as described above, when the current is passed through the injector 20, the injector 20 opens the outlet orifice 23e so as to drive the nozzle needle 21d, thereby returning the fuel in the command chamber Cd to the fuel tank 10. For this reason, while the injector 20 performs the injection action, the fuel pressure in the common rail 12 leaks through the inlet orifice 22g and the outlet orifice 23e. In other words, a pressure decrease at this time corresponds to a gradual pressure drop (pressure leak) in the ineffective injection period. The pressure drop point in which the pressure starts to sharply drop corresponds to the timing when the injection is actually started through the injector 20, that is, an injection starting point. In FIGS. 5A-5C, timing t2 corresponds to the injection starting timing.

After the injection starting point, the injection rate increases with the lift action of the needle 21d, and when the injection rate reaches a maximum injection rate (timing t3), the injection state of the maximum injection rate is held thereafter. At this time, the pressure transition (pressure transition waveform) drops until the injection rate reaches the maximum injection rate and then becomes nearly constant after the injection rate reaches the maximum injection rate.

When the injection command signal is made to fall at timing t4, the outer valve 23b is moved to a closing position and hence the outlet orifice 23e is closed, which causes the inlet pressure to increase slightly (timing t5). Then, the pressure transition waveform shows the following tendency: when the outlet orifice 23e is closed and the fuel pressure in the command chamber Cd is sufficiently increased, the nozzle needle 21d starts the lift action to close the valve (timing t6), whereby the injection rate is decreased and the inlet pressure is sharply increased. Then, at timing t7, the nozzle needle 21d returns to a totally closed position and the injection rate becomes zero. Thereafter, the inlet pressure waves near the pressure value before the injection.

The point (zero cross point) in which the pressure value crosses the pressure value before the injection corresponds to timing when the injector 20 stops injecting the fuel, that is, an injection finishing point. Timing t7 corresponds to the injection finishing timing. In the injector 20, just as the ineffective injection time at the time of starting the injection, also at the time of finishing the injection, a delay is caused in the period from the timing when the passing of current is stopped (the injection command pulse falls) to the injection finishing timing.

Next, processing relating to the learning (updating) of an injection correction coefficient and the like, performed by the fuel injection apparatus (ECU 30) of this embodiment, will be described. The processing is broadly divided into:

(1) the processing of sequentially acquiring the sensor output of the pressure sensor 20a at intervals of "20 μsec" to detect or acquire pressure variation, that is, the mode of variation in pressure caused by the injection action and the actual injection of the injector 20 (in more detail, the processing of acquiring the pressure variation as the pressure transition waveform); and (2) the processing of storing injection characteristic data in a specified storage device (the EEPROM 32) in relation to the injection condition of the injection pattern on the basis of the acquired pressure transition waveform (the processing includes the processing of updating the data appropriately).

Hereinafter, the learning processing will be described in detail with reference to FIG. 4. FIG. 4 is a flow chart showing the processing procedure of the learning processing. The pressure detection and the operation processing associated with the pressure detection require high-speed processing, so that it is desirable that the learning processing is performed by use of a high-speed operation device such as a digital signal processor (DSP). In this embodiment, a series of processing shown in FIG. 4 corresponds to "injection characteristic computing means" and "learning means."

In FIG. 4, first, in step S21, the output signal of the pressure sensor 20a is read to detect a fuel pressure at this time. In the subsequent step S22, it is determined whether a learning performance condition is satisfied. Specifically, the learning performance condition includes the following respective conditions.

(1) The fuel pressure measured by the pressure sensor 20a is within a specified range. The measured fuel pressure corresponds to a base pressure value.

(2) A fuel temperature is within a specified range. This fuel temperature is detected by a fuel temperature sensor housed in the fuel pump 11.

(3) A command of fuel injection of a specified injection pattern is issued for a cylinder for which the learning processing is to be performed and the injection pattern is being performed. Further, the injection quantity (command value) is within a specified range (for example, a specified value or less).

(4) Various sensors relating to the learning processing normally operate.

When all of the respective conditions are satisfied, it is determined that the learning performance condition is satisfied, and the processing advances to the subsequent step S23. In contrast to this, when any one of the respective conditions is not satisfied, it is determined that the learning condition is not satisfied, and this processing is finished without performing any more processing. Then, after the step S23, the detection of the injection characteristics is performed on the basis of the fuel pressure (inlet pressure).

That is, in step S23, it is determined whether or not an injection starting point is already detected at the time of starting to drive the injector 20. When the injection starting point is not yet detected, the processing proceeds to step S24. In step S24, it is determined on the basis of the fuel pressure (inlet pressure) measured by the pressure sensor 20a whether or not the present point is the injection starting point.

Describing the step S24 more specifically, it is determined whether the time that elapses after the driving of the injector 20 is started is within a specified time (which is varied, for example, by the injection quantity) and whether the fuel pressure (inlet pressure) at this time is smaller than a specified threshold value TH1 (pressure<threshold value TH1). The threshold value TH1 is a pressure determination value for detecting the injection starting point and is set at a pressure value showing the injection starting point (a value near a pressure at which the pressure starts to drop sharply) on the basis of an appropriate value found previously by experiment or the like. However, the pressure value showing the injection starting point is varied according to the kind and the individual difference of the fuel injector. For this reason, so as to detect the injection starting point with high accuracy, the value of the threshold value TH1 is set at an optimal value individually for each fuel injector. It is also recommended that the injection starting point is not directly detected by the threshold value TH1 but that the injection starting point is indirectly detected in the following manner: for example, a specified timing near the injection starting point is detected by the threshold value TH1 and the injection starting point is indirectly detected on the basis of the detected specified timing.

When it is determined in step S24 that the present point is the injection starting point, the processing proceeds to step S241 in which the time of the present point (that is, injection starting timing) is stored as injection starting point data in the memory (RAM or the like).

When the injection starting point is detected in the manner described above, it is determined in step S23 that the injection starting point is already detected, and in the subsequent step S25, it is determined on the basis of the fuel pressure (inlet pressure) measured by the pressure sensor 20a whether the present point is an injection finishing point. When it is determined in step S25 that the present point is not the injection finishing point, it is determined in step S26 on the basis of fuel pressure (inlet pressure) measured by the pressure sensor 20a whether the present point is a point at which a maximum injection rate is achieved.

Describing the step S25 more specifically, it is determined whether the time that elapses after the injection starting point is within a specified time (which is varied, for example, by the injection quantity) and whether the fuel pressure (inlet pressure) at that time is larger than a specified threshold value TH3 (fuel pressure>threshold value TH3). Describing the step S26 more specifically, it is determined whether the time that elapses after the injection starting point is within a specified time (which is varied, for example, by the injection quantity) and whether the fuel pressure (inlet pressure) at that time is smaller than a specified threshold value TH2 (fuel pressure<threshold value TH2).

The threshold values TH2 and TH3 are pressure determination values for detecting the maximum injection rate point and the injection finishing point (TH2<TH3) and are set on the basis of appropriate value found previously, for example, by experiment or the like, just as the above-mentioned threshold value TH1. It is also preferable that these threshold values TH2 and TH3 can be set at optimal values individually for the respective fuel injectors and that the respective above-mentioned timings can be indirectly detected, which is the same as in the case of the threshold value TH1.

In the actual lapse of time, the point of the maximum injection rate is detected earlier (Yes in step S26), and then the injection finishing point is detected (Yes in step S25).

Then, when it is determined in step S26 that the present point is the point at which the maximum injection rate is achieved, the processing proceeds to step S261 where the time of the present point (that is, the timing when the maximum injection rate is achieved) is stored as the maximum injection rate data in the memory (RAM or the like). When it is determined in step S25 that the present point is the injection finishing point, the processing proceeds to step S251 where the time of the present point (that is, the injection finishing timing) is stored as the injection finishing point data in the memory (RAM or the like).

Describing the above-mentioned processing by use of the time charts shown in FIGS. 5A-5C, the injection starting point is detected at the timing t2, and then the achievement of the maximum injection rate is detected at the timing t3, and then the injection finishing point is detected at the timing t7.

After the injection finishing point is detected and is stored as data, in step S252, injection parameters other than the injection starting point and the injection finishing point are detected on the basis of the fuel pressure (inlet pressure).

Specifically, for example, an injection period (injection time) is computed on the basis of the injection starting point and the injection finishing point, or the maximum value of the injection rate is computed on the basis of the fuel pressure after the timing when the fuel pressure becomes lower than the threshold value TH2. At this time, it is determined that as the quantity of variation to the negative side of the fuel pressure becomes larger, the injection rate becomes larger. The injection quantity is estimated and corrected on the basis of the injection period and the pressure value measured by the pressure sensor 20a. Specifically, the injection rate is estimated on the basis of pressure value measured by the pressure sensor 20a, and the injection rate (estimated value) is multiplied by the injection time to compute (estimate) the injection quantity. In addition, it is also possible to compute the speed of change when the injection rate is increased from the rate of change (speed of change) of the fuel pressure after the injection starting point (for example, the period from t2 to t3 in FIGS. 5A-5C) or to compute the speed of change when the injection rate is decreased from the rate of change (speed of change) of the fuel pressure before the injection finishing point (for example, the period from t6 to t7 in FIGS. 5A-5C).

Then, it is determined in step S27 whether the updating condition of the learning data is satisfied. The updating condition can be set arbitrarily. For example, the condition where the acquiring of the injection characteristic data of one fuel injection (injection pattern) is completed is assumed to be the updating condition. When the updating condition is satisfied, the processing proceeds to the subsequent step S28. When the updating condition is not satisfied, this processing is finished without performing any other processing.

In step S28, the injection correction coefficient is computed on the basis of the injection starting point, the injection finishing point, the point at which the maximum injection rate is achieved, and the other injection parameters (the respective values stored in steps S241, S251, S252, and S261) which have been described above. This injection correction coefficient is used for correcting the command value (command signal) issued to the injector 20 as described above, and the number of steps of injection, the injection timing, the injection time, and the injection interval are changed as appropriate by this correction.

Thereafter, in step S29, the injection characteristic data is stored in the EEPROM 32. The injection characteristic data includes the injection starting point, the injection finishing point, the point at which the maximum injection rate is achieved, the other injection parameters (the respective values stored in steps S241, S251, S252, and S261), and the injection correction coefficient (value computed in step S28), which have been described above. In this case, the injection characteristic data is stored in relation to the corresponding injection cylinder and the injection condition (injection pattern and base pressure at the time of injection).

In the above-mentioned steps S24 to S26, the fuel pressure (inlet pressure) of the time is compared with the threshold values TH1 to TH3 to thereby detect the injection starting point, the point at which the maximum injection rate is achieved, and the injection finishing point, but this method may be changed. For example, the differential value of the fuel pressure (inlet pressure) is computed, and the injection starting point, the point at which the maximum injection rate is achieved, and the injection finishing point are detected on the basis of a change in the differential value. At the timing t2, the differential value of the pressure is sharply increased to a negative side, whereby the injection starting point is detected. At the timing t3, the differential value of the pressure becomes nearly zero, whereby it is detected that the maximum injection rate is achieved. At the timing t7, the differential value of the pressure is reversed from a positive value to a negative value, whereby the injection finishing point is detected.

The fuel pressure measured by the pressure sensor 20a develops a slight delay to a change in the actual injection rate (pressure propagation delay, see FIG. 5D). Thus, it is desirable to find the injection starting point, the point at which the maximum injection rate is achieved, and the injection finishing point in consideration of the delay.

In the fuel injection system of this embodiment, the fuel is supplied intermittently from the high-pressure pump 11b to the common rail 12, and the fuel pressure in the common rail 12 is controlled to a request value. In other words, in the high-pressure pump 11b of the fuel pump 11, the action of no-fuel-feeding (suction) and the action of fuel-feeding (discharge) are repeatedly performed. In this case, when the fuel is injected by the injector 20, the fuel pressure (inlet pressure) is varied (lowered) by the injection. However, when the pressure-feeding of the fuel by the fuel pump 11 and the injecting of the fuel by the injector 20 are performed at the same time, a pressure value in which a pressure variation component caused by the pressure-feeding of the fuel by the fuel pump 11 (hereinafter referred to as "pressure variation component caused by pump pressure-feeding") is added to a pressure component caused by the injecting of the fuel by the injector 20 is detected as the pressure value measured by the pressure sensor 20a. As a result, there is a possibility that the computation accuracy of the injection characteristic data (the data of the injection starting point, the injection finishing point, and the like) might be deteriorated.

FIG. 6 is a time chart to show the relationship between the timings of the injection commands issued to the injectors 20 of the respective cylinders and the timings of pressure-feeding the fuel by the fuel pump 11. In FIG. 6, generally, the injection command signals are outputted to the injectors 20 of the respective cylinders at intervals of a nearly constant crank angle (at intervals of about 180° C.A. in the 4-cylinder engine). In addition, the fuel pump 11 pressure-feeds the fuel at the nearly same intervals (at intervals of about 180° C.A.) and in the same period as each injector 20 injects the fuel, whereby the fuel pressure is increased along with the pressure-feeding of the fuel (for the sake of convenience, a pressure drop caused by the fuel injection is neglected in the graph shown in FIG. 6).

When the injecting of the fuel by the injector 20 and the pressure-feeding of the fuel by the fuel pump 11 are performed at the same time as described above, the pressure measured by the pressure sensor 20a is varied by the pressure variation component caused by pump pressure-feeding. This will be described in more detail with reference to FIGS. 7A-7E. The fuel injection action shown in FIG. 7A-7E corresponds to the fuel injection action shown in FIGS. 5A-5D. FIG. 7A shows the transition of the injection command signal to the injector 20; FIG. 7B shows the transition of the injection rate; FIG. 7C shows the transition of the pressure (inlet pressure), measured by the pressure sensor 20a, of the injection cylinder; FIG. 7D shows the transition of the pressure (inlet pressure), measured by the pressure sensor 20a, of the non-injection cylinder; and FIG. 7E shows the pressure value corresponding to the pressure variation component caused by pump pressure-feeding, respectively. The pressure waveform shown by a dashed line shows the transition of the fuel pressure when the pressure variation component caused by the pump pressure-feeding does not have an effect (pressure variation component caused by the pump pressure-feeding=zero), and this pressure waveform corresponds to the pressure waveform shown in FIG. 5C.

In FIGS. 7A-7E, at timing t11, the fuel pump 11 starts the pressure-feeding of the fuel, and the pressure variation component caused by the pump pressure-feeding starts to increase along with this. With this, the pressure value measured by the pressure sensor 20a starts to vary according to the pressure variation component caused by the pump pressure-feeding. At this time, as for the injection cylinder in which the fuel is injected by the injector 20, as shown by a solid line in FIG. 7C, the inlet pressure becomes the pressure waveform in which the pressure variation component caused by the pump pressure-feeding is added to the pressure transition waveform developed by the fuel injection by the injector 20. In contrast to this, as for the non-injection cylinder (so-called back cylinder) in which the fuel is not injected by the injector 20, as shown by a solid line in FIG. 7D, the inlet pressure forms the same pressure waveform as the pressure variation component caused by the pump pressure-feeding. At this time, in the non-injection cylinder, a pressure variation (increase) is caused in the inlet pressure only by the pressure variation component caused by the pump pressure-feeding with reference to the inlet pressure when the fuel is not pressure-fed by the fuel pump.

When the inlet pressure of the injection cylinder is affected by the influence of the fuel pressure-feeding by the fuel pump 11, as described above, there is the possibility that the computation accuracy of the injection characteristic data (data of the injection starting point, the injection finishing point, and the like) might be decreased.

Thus, in this embodiment, when the injector 20 injects the fuel into a cylinder, the pressure measured by the pressure sensor 20a in the injection cylinder is corrected by a pressure variation component caused by the pressure-feeding of the fuel by the fuel pump 11 (pressure variation component by the pump pressure-feeding), and the injection characteristic data is computed on the basis of the pressure value after the correction. The pressure variation component by the pump pressure-feeding is computed on the basis of the pressure measured by the pressure sensor 20a in the non-injection cylinder in which the injector 20 does not inject the fuel.

Figure 8A:
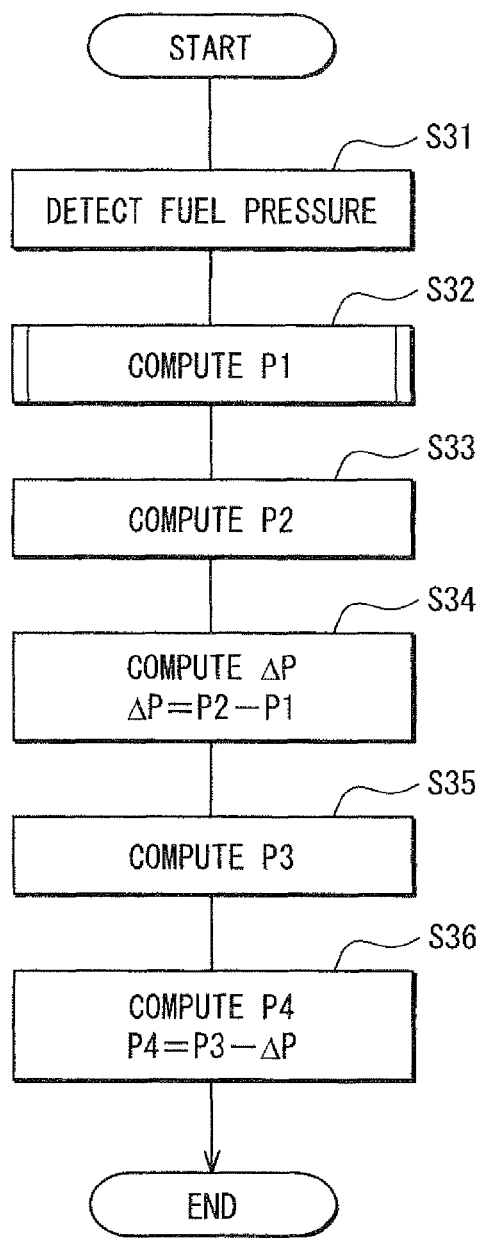
FIGS. 8A and 8B are flow charts to show the procedure of the processing of correcting fuel pressure.

FIG. 8A is a flow chart showing a procedure of the processing of correcting the fuel pressure. This processing is sequentially performed at intervals of a specified crank angle or a specified time (for example, at intervals of 20 μsec). This processing may be performed as a part of the pressure detection processing in step S21 in the processing shown in FIG. 4.

In FIG. 8A, in step S31, the output signal of the pressure sensor 20a is read to detect the fuel pressure at that time. At this time, in particular, in all cylinders (all cylinders of #1 to #4 in this embodiment) each having the pressure sensor 20a fitted thereto, the fuel pressure of each cylinder is detected by the output signal of the pressure sensor 20a.

In the subsequent step S32, the fuel pressure when the fuel is not pressure-fed by the fuel pump 11 (hereinafter referred to as "fuel not-pressure-feeding pressure P1") is computed. This processing is the processing of detecting the fuel pressure immediately before the fuel pump 11 pressure-feeds the fuel, and the detail of the processing is shown in FIG. 8B.

Figure 8B:
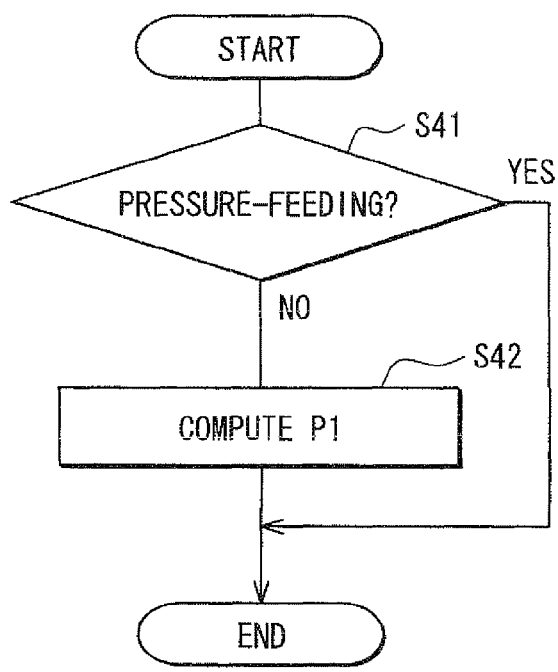

In FIG. 8B, in step S41, it is determined whether the fuel pump 11 pressure-feeds the fuel now. When the fuel pump 11 does not pressure-feed the fuel, the processing proceeds to step S42 and the fuel not-pressure-feeding pressure P1 is computed on the basis of the pressure value measured by the pressure sensor 20a. At this time, it is desirable that the fuel not-pressure-feeding pressure P1 is found in such a way as to eliminate the effect of the pressure variation caused by the fuel injection of the injector 20 (including pressure variation after the fuel injection), that is, it is recommended to compute the fuel not-pressure-feeding pressure P1 on the condition that the pressure variation caused by the fuel injection is within a specified allowable level. For example, it is recommended to select a cylinder other than the cylinder in which the fuel injection is being preformed or the cylinder in which the fuel injection has just finished from among all cylinders as a target cylinder, and to compute the fuel not-pressure-feeding pressure P1 on the basis of the pressure value measured by the pressure sensor 20a of the target cylinder.

Returning to FIG. 8A, in step S33, the fuel pressure of the non-injection cylinder (hereinafter referred to as "non-injection cylinder pressure P2") is computed on the basis of the pressure value measured by the pressure sensor 20a of the non-injection cylinder. The non-injection cylinder pressure P2 is computed by the average value of the pressures of the fuel supplied to the respective injectors 20 of plural non-injection cylinders (average value of the pressure values measured by the pressure sensors 20a in the plural non-injection cylinders). Then, in step S34, the pressure variation component ΔP by the pump pressure-feeding is computed by the difference between the fuel not-pressure-feeding pressure P1 and the non-injection cylinder pressure P2 (ΔP=P2−P1).

Thereafter, in step S35, the fuel pressure of the injection cylinder (hereinafter referred to as "injection cylinder pressure P3") is computed on the basis of the pressure value measured by the pressure sensor 20a of the injection cylinder at that time. In step S36, the injection cylinder pressure P3 is corrected by the pressure variation component ΔP to compute a corrected pressure P4 (P4=P3−ΔP). The corrected pressure P4 is used for the learning processing (see FIG. 4) or the like.

In this embodiment, the steps S31, S35 correspond to "first pressure detecting means," and the steps S32 to S34 correspond to "second pressure detecting means," and the step S36 corresponds to "injection pressure computing means."

Describing the processing of correcting the fuel pressure with reference to FIG. 7, the fuel not-pressure-feeding pressure P1 is computed at timing t10, and the pressures P2 to P4 are computed in succession after timing t11 that is the timing when the fuel pump 11 starts to pressure-feed the fuel. In other words, for example, at timing t12, the non-injection cylinder pressure P2 is computed, and the pressure variation component ΔP is computed by the pressure values P1 and P2, and the injection cylinder pressure P3 is corrected by the pressure variation component ΔP, whereby the corrected pressure P4 is computed. The pressure transition waveform by the corrected pressure P4 becomes a pressure waveform shown by a dashed line in FIG. 7C. According to this pressure waveform, the injection characteristic data (data such as the injection starting point and the injection finishing point) can be computed with high accuracy.

Figure 9:
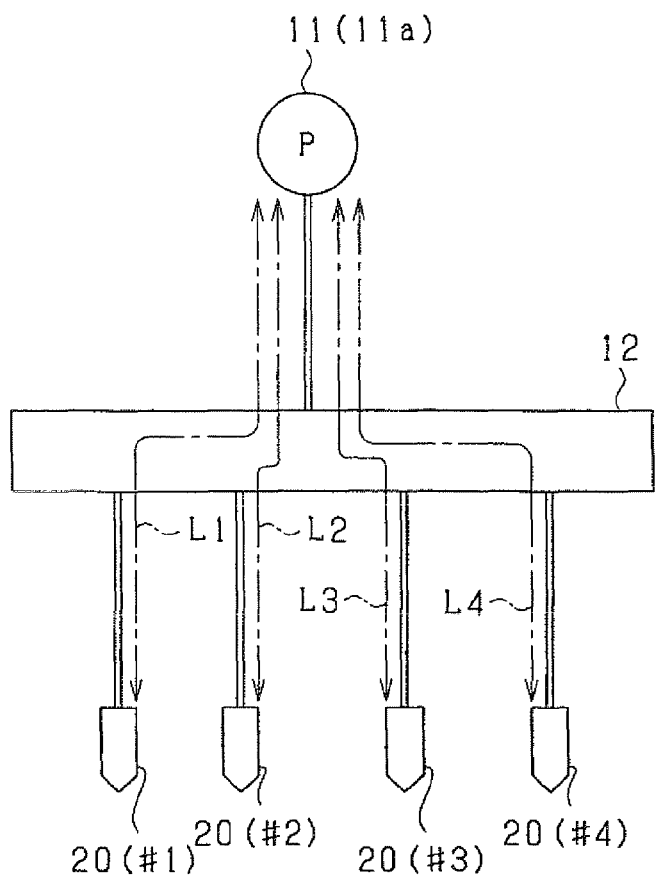
FIG. 9 is a schematic diagram to show that a piping length is different between cylinders.

When viewing a fuel path from the fuel pump 11 to the injector 20 of each cylinder, the fuel path length (piping length) is different for each of the cylinders. In other words, as shown in FIG. 9, the fuel path lengths L1, L2, L3, and L4 from the fuel pump 11 to the respective cylinders (#1 to #4) are different from each other. With this, the time required for increasing fuel pressure in each cylinder by the injector 20 is made different from each other. The timing when the pressure variation is caused by the pressure-feeding of the fuel is made different between the injectors 20 of the respective cylinders. For example, regarding the cylinders #1 and #2, because L1>L2, the detection of the pressure increase by the pressure sensor 20a fitted to the injector 20 of the first cylinder (#1) is performed later than the detection by the pressure sensor 20a fitted to the injector 20 of the second cylinder (#2).

Thus, in this embodiment, when the non-injection cylinder pressure P2 is computed (in step S33), the difference in pressure increasing time between the injection cylinder and the non-injection cylinder is eliminated by taking into consideration the differences in the fuel path lengths (L1 to L4) from the fuel pump to the injectors of the respective cylinders between the respective cylinders. Specifically, it suffices to shift the fuel pressure data, which are acquired in succession, back and forth on the axis of time. For example, when it is assumed that the cylinder #1 is the injection cylinder and the cylinder #2 is the non-injection cylinder, the fuel pressure data of the non-injection cylinder #2 is delayed by the difference (L1−L2) in the fuel path length between these cylinders. Contrarily, when it is assumed that the cylinder #1 is the non-injection cylinder and the cylinder #2 is the injection cylinder, the fuel pressure data of the injection cylinder #2 is advanced by the difference (L1−L2) in the fuel path length between these cylinders. With this, the fuel pressure (detected pressure) in the injection cylinder can be synchronized with the fuel pressure (detected pressure) in the non-injection cylinder on the axis of time.

According to this embodiment described above, the following advantage can be obtained.

The pressure measured by the pressure sensor 20a in the injection cylinder is corrected by the pressure variation caused by the pressure-feeding of the fuel by the fuel pump 11, and the injection characteristic data is computed on the basis of the pressure value after correcting the measured pressure. Thus, the pressure variation caused by the fuel injection can be found with high accuracy without any the influence caused by the pressure-feeding of the fuel by the pump. Therefore, the injection characteristics of the injector 20 can be found with high accuracy, and hence the control accuracy relating to the fuel injection can be greatly improved.

The fuel pressure is detected on the basis of the output of the pressure sensor 20a which is integrally fitted to the injector 20. Thus, the fuel pressure can be detected at a position close to the injection openings 21c of the injector 20. Therefore, when the fuel pressure is varied (decreased) by the fuel injection, the pressure variation of the fuel can be detected before the pressure variation is damped, and hence the pressure variation when the fuel is injected can be acquired with high accuracy.

The output of the pressure sensor 20a is acquired in succession at small intervals (at intervals of 20 μsec in the embodiment). That is, the output of the pressure sensor 20 is acquired in such a manner that the trace of the pressure transition waveform can be drawn by the measured pressure. Thus, the pressure variation caused by the fuel injection can be found in detail.

When the pressure variation component caused by the pressure-feeding of the fuel by the fuel pump 11 (pressure variation component ΔP by pump pressure-feeding) is computed, the pressure variation component ΔP by the pump pressure-feeding is computed based on the difference between the fuel not-pressure-feeding pressure (P1 in FIG. 7) and the fuel pressure-feeding pressure (P2 in FIG. 7), so that the pressure variation component ΔP can be found correctly. Therefore, the quantity of pressure variation directly related to the fuel injection can be correctly computed, and hence the computation accuracy of the injection characteristics can be enhanced.

The fuel pressure-feeding pressure (P2 in FIG. 7) is computed by the fuel pressure in the injector 20 of the non-injection cylinder (so-called back cylinder). Thus, the pressure variation component by the pump pressure-feeding can be found with high accuracy in synchronization with the fuel injection in the injection cylinder.

When the non-injection cylinder pressure P2 and the injection cylinder pressure P3 are computed, the difference between the fuel path length from the fuel pump 11 to the injector 20 of the injection cylinder and the fuel path length from the fuel pump 11 to the injector 20 of the non-injection cylinder is taken into consideration. Thus, the computation accuracy of the pressure variation component ΔP by the pump pressure-feeding can be increased.

The non-injection cylinder pressure P2 is computed by the average value of the pressures of the fuel supplied to the respective injectors 20 of the plural non-injection cylinders. Thus, the variations in the fuel pressure in the plural non-injection cylinders can be eliminated and hence the pressure variation component ΔP by the pump pressure-feeding can be computed with high accuracy.

The fuel not-pressure-feeding pressure P1 is computed on the condition that the pressure variations of the fuel injection by the injector 20 and after the fuel injection are within an allowable level. Thus, even when the pressure variation continues after the fuel injection, the fuel not-pressure-feeding pressure P1 can be computed with high accuracy without any influence of the pressure variation.

According to the pressure detected by the pressure sensor 20a, the actual injection starting point, the actual injection finishing point, the injection rate, the speed of change in the injection rate, the maximum injection rate, which are achieved by the injector 20, can be computed as the injection characteristic data with high accuracy. With this, the deviation in the injection characteristics due to the individual difference and the secular change of the injector 20 or the like can be grasped correctly. For example, it can be determined on the basis of the injection characteristic data whether the injector 20 and the pressure sensor 20a are abnormal (faulty).

The injection characteristic data is stored as a learning value in the backup memory (EEPROM 32 or the like) and the learning value is used for the fuel injection control. Thus, when a deviation in the characteristics is caused by the individual difference and the secular change of the injector 20 and the like, a steady control error caused by the deviation in the characteristics can be eliminated suitably in the fuel injection control.

Second Embodiment

A second embodiment will be described hereinafter. The description of the portion that overlaps the first embodiment will be simplified and the different points between the two embodiments will be mainly described. The system configuration shown in FIG. 1 and the configuration of the injector 20 are the same as those shown in FIG. 2. The pressure sensor 20a is integrally fitted to the injector 20 and the fuel pressure is detected on the basis of the output of the pressure sensor 20a.

This embodiment employs the construction in which the injection characteristics by the injector 20 are computed on the basis of the pressure variation data that is the difference between the fuel pressure in the injection cylinder and the fuel pressure in the non-injection cylinder.

Figure 10:
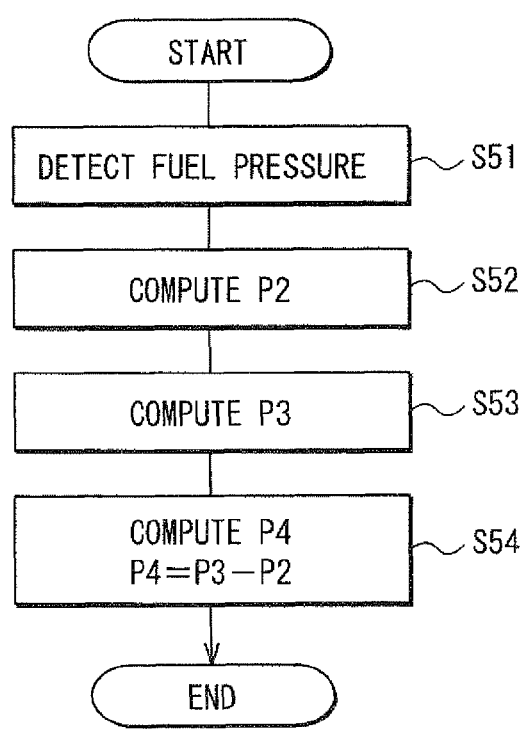
FIG. 10 is a flow chart to show the procedure of the processing of correcting fuel pressure in a second embodiment.

FIG. 10 is a flow chart showing the procedure of the processing of correcting the fuel pressure. This processing is performed by the ECU 30 in place of the above-mentioned processing shown in FIGS. 8A and 8B.

In step S51, the output signal of the pressure sensor 20a is read to detect the fuel pressure at that time. In the subsequent step S52, the non-injection cylinder pressure P2 is computed on the basis of the pressure value measured by the pressure sensor 20a of the non-injection cylinder.

When the non-injection cylinder pressure P2 is computed, just as step S33 in FIG. 8A, the non-injection cylinder pressure P2 is computed by the average value of the pressures of the fuel supplied to the respective injectors 20 of the plural non-injection cylinders (average value of the pressure values measured by the pressure sensors 20a in the plural non-injector cylinders). At this time, just as step S33 in FIG. 8A, it is desirable to eliminate the difference in the pressure increasing time between the injection cylinder and the non-injection cylinder by considering the difference in the fuel path length from the fuel pump to the injector between the cylinders. Specifically, it suffices to shift the fuel pressure data, which are acquired in succession, back and forth on the axis of time.

Then, in step S53, the injection cylinder pressure P3 is computed on the basis of the pressure value measured by the pressure sensor 20a of the injection cylinder. Finally, in step S54, the injection cylinder pressure P3 is corrected by the non-injection cylinder pressure P2 to compute corrected pressure P4 (P4=P3−P2). The corrected pressure P4 is used for the learning processing (FIG. 4) and the like.

In this embodiment, the steps S51 and S53 correspond to "injection cylinder pressure detecting means," and the steps S51 and S52 correspond to "non-injection cylinder pressure detecting means," respectively.

The processing of correcting the fuel pressure in this embodiment will be described with reference to FIG. 7. FIG. 7 is the time chart that has been described in the first embodiment, and the timings t10 to t12 have been described. However, in this embodiment, it is unnecessary to compute the fuel not-pressure-feeding pressure P1 at the timing t10 and to compute the pressure variation component ΔP by pump pressure-feeding at the timing t12.

In FIG. 7, after the timing t11 that is the timing when the fuel pump 11 starts pressure-feeding the fuel, for example, at the timing t12, the non-injection cylinder pressure P2 and the injection cylinder pressure P3 are computed, and the non-injection cylinder pressure P2 is subtracted from the injection cylinder pressure P3, whereby the corrected pressure P4 is computed. The pressure transition waveform by the corrected pressure P4 becomes the pressure waveform shown by the dashed line in FIG. 7C. According to the pressure waveform, the injection characteristic data (data such as the injection starting point and the injection finishing point) can be computed with high accuracy.

However, in this embodiment, the fuel not-pressure-feeding pressure P1 is not computed, which is different from the first embodiment. The corrected pressure P4 acquired by "the injection cylinder pressure P3—the non-injection cylinder pressure P2" is a numerical value that does not have an absolute pressure level, that is, a relative value that varies after fuel injection with reference to a value of "0" before the fuel injection. However, this embodiment is not different from the first embodiment in that a pressure transition waveform corresponding to the injection starting/finishing and a change in the injection rate can be acquired. Thus, as described above, the injection characteristic data such as the injection starting point, the injection finishing point, and the point at which the maximum injection rate is achieved can be computed in the same way.

As described above, also in the second embodiment, the pressure variations caused by the fuel injection can be found with high accuracy without any influence produced by the pressure-feeding of the fuel by the pump. Thus, the injection characteristics of the injector 20 can be found with high accuracy, and the control accuracy of the fuel injection can be greatly improved.

Other Embodiment

The present invention is not limited to the embodiments described above, but may be performed, for example, in the following manner.

(1) The first embodiment employs the configuration in which when the pressure variation quantity (the pressure variation component ΔP by pump pressure-feeding) of the difference between the fuel not-pressure-feeding pressure and the fuel pressure-feeding pressure is computed, the fuel pressure-feeding pressure (P2 in FIG. 7) is computed not only by the fuel pressure in the injector 20 of the injection cylinder but also by the fuel pressure in the injector 20 of the non-injection cylinder of the back cylinder. This configuration may be changed. For example, the fuel not-pressure-feeding pressure and the fuel pressure-feeding pressure are computed for the same cylinder (injection cylinder), and the pressure variation quantity is computed based on the difference between these pressures. More specifically, when a specified injection stop condition is satisfied for a cylinder for which the injection characteristic data is to be acquired, the injecting of the fuel into the cylinder by the injector 20 is stopped, and when the fuel injection is stopped and the fuel is being pressure-fed by the fuel pump, the fuel pressure-feeding pressure is computed.

In other words, when the fuel is not injected (fuel is cut), a pressure variation caused by the fuel injection is not developed, and hence if a pressure variation is developed, the pressure variation is caused by the pressure-feeding of the fuel by the fuel pump 11. Thus, the fuel pressure-feeding pressure can be computed correctly. In the case of this configuration, a number of fuel pressure-feeding pressures when the fuel is not injected are found for each fuel pressure level. When the fuel is injected, the pressure variation quantity (pressure variation component ΔP by pump pressure-feeding) can be computed by the selective use of the fuel pressure-feeding pressure of the same fuel pressure level (for example, of the same target pressure).

As described above, in the configuration in which the fuel pressure-feeding pressure and the fuel not-pressure-feeding pressure are computed for the same cylinder, the pressure variation quantity (pressure variation component ΔP) can be computed with high accuracy without taking into consideration the difference in the fuel path length between the cylinders.

(2) The computing of the injection characteristic data of the injector 20 and the computing of the learning value (injection correction coefficient and the like) on the basis of the injection characteristic data are performed only for a specified cylinder. In this case, when the learning processing is performed only for the specified cylinder, the injection correction coefficient and the like of the other cylinder can be also corrected (updated) according to the result of the learning processing.

(3) In the above-mentioned embodiments, the pressure sensor 20a is fitted to the fuel suction port of the injector 20, but in addition to this construction, the following constructions can be applied. In short, it suffices for the pressure sensor 20a to be fitted downstream of the fuel outlet of the common rail 12 in the direction of fuel flow in the fuel passage from the common rail 12 to the injection port of the injector 20. For example, the pressure sensor 20a is disposed in the middle of the piping 14 for connecting the common rail 12 and the injector 20. Alternatively, the pressure sensor 20a is disposed in the connection part 12a of the common rail 12 and the piping 14. In this case, it is desirable that the pressure sensor 20a is disposed downstream of fuel pulsation reducing means (orifice or the like), which is disposed in the connection part 12a, in the direction of the fuel flow. Alternatively, the pressure sensor 20a is disposed in the fuel passage arranged in the injector 20 (for example, near the injection openings 21c in FIG. 2).

(4) The number of the fuel pressure sensors may be determined arbitrarily, and for example, two or more fuel pressure sensors may be disposed for the fuel passage of one cylinder. In the above-mentioned embodiments, the pressure sensor 20a is disposed for each cylinder. However, the pressure sensor is disposed only for a part of the cylinders (for example, one cylinder), and the estimated value based on the output of the sensor may be used for the other cylinders.

(5) A rail pressure sensor for measuring pressure in the common rail 12 may be provided and the pressure variation quantity when the fuel is pressure-fed by the fuel pump 11 may be computed on the basis of the output of the rail pressure sensor. In other words, a varying pressure when the fuel is pressure-fed can be detected by the common rail pressure sensor employed in the ordinary common rail type fuel injection system. In this case, the quantity of pressure variation caused when the fuel is pressure-fed by the fuel pump 11 (pressure variation component ΔP) is computed on the basis of the output of the rail pressure sensor.

(6) A piezo-electrically driven injector may be used in place of the electromagnetically driven injector shown in FIG. 2. A fuel injector not causing a pressure leak, for example, a direct-acting injector not using the command chamber Cd so as to transmit a driving power (for example, direct-acting piezoelectric injector that has been developed in recent years) can be also used. When the direct-acting injector is used, the injector rate can be easily controlled.

(7) A fuel injector may be a valve whose injection opening is opened or closed by a needle or may be an externally opened valve.

(8) While the configuration in which the sensor output of the pressure sensor 20a is acquired in succession at intervals of "20 μsec" has been described in the above-mentioned embodiments, the interval of acquiring the sensor output can be changed as appropriate within a range capable of capturing the tendency of the above-mentioned pressure variation. However, according to the experiment made by the inventor, an interval shorter than "50 μsec" is effective.

(9) The kind of the engine to be controlled and the construction of the system can be changed as appropriate according to the use or the like. The present invention can be applied, for example, also to a gasoline engine of a spark ignition type (in particular, direct injection type engine) in the same way. The fuel injection system of a direct injection type gasoline engine is provided with a delivery pipe for storing fuel (gasoline) in a high-pressure state. The fuel is pressure-fed to this delivery pipe from the fuel pump, and the high-pressure fuel in the delivery pipe is injected and supplied to the combustion chamber of the engine. In this system, the delivery pipe corresponds to an accumulation container.

The apparatus and the system according to the present invention can be used for the controlling of the fuel injection pressure of not only the fuel injector for directly injecting the fuel into the cylinder but also the fuel injector for injecting the fuel into an intake passage or an exhaust passage of the engine. A fuel injector of a target is not limited to the injector shown as an example in FIG. 2 but is an arbitrary type of valve. When the construction is changed in this manner in the above-mentioned embodiments, it is preferable that the details of the above-mentioned various kinds of processing (programs) are changed into an appropriate optimal mode according to the actual construction.

(10) In the above-mentioned embodiments and their modifications, it is thought that various kinds of software (programs) are used. However, the same function may be realized by hardware such as an exclusive circuit.

What is claimed is:

1. A fuel injection controller for an internal combustion engine that is applied to an accumulator type fuel injection system including an accumulation container for accumulating and holding high-pressure fuel, a fuel pump for pressure-feeding a fuel to the accumulation container, and fuel injectors for injecting the high-pressure fuel accumulated in the accumulation container, the fuel injection controller comprising:

first pressure detecting means that sequentially detects a first fuel pressure varied when the fuel injector injects the fuel;
second pressure detecting means that sequentially detects a second fuel pressure varied when the fuel pump pressure-feeds the fuel;
injection pressure computing means that corrects the first fuel pressure based on the second fuel pressure that is detected concurrently with the first fuel pressure when the fuel injector injects the fuel, thereby computing an injection pressure; and
injection characteristic computing means that computes an injection characteristic by the fuel injector on the basis of the injection pressure computed by the injection pressure computing means, wherein
the first pressure detecting means detects the first fuel pressure downstream of a fuel outlet of the accumulation container in a fuel passage from the accumulation container to an injection port of the fuel injector, and
the second pressure detecting means detects the second fuel pressure downstream of the fuel outlet of the accumulation container in a fuel passage from the accumulation container to an injection port of another fuel injector.

2. A fuel injection controller according to claim 1, further comprising
a fuel pressure sensor disposed downstream of a fuel outlet of the accumulation container in a fuel passage from the accumulation container to an injection port of the fuel injector, wherein
the first pressure detecting means detects the first fuel pressure varied when the fuel is injected on the basis of an output of the fuel pressure sensor.

3. A fuel injection controller according to claim 1, wherein the second pressure detecting means includes:
means for computing a fuel not-pressure-feeding pressure that is a fuel pressure when the fuel pump does not pressure-feed the fuel;
means for computing a fuel pressure-feeding pressure that is a fuel pressure when the fuel pump pressure-feeds the fuel; and
means for computing a quantity of pressure variation caused when the fuel pump pressure-feeds the fuel by a difference between the fuel not-pressure-feeding pressure and the fuel pressure-feeding pressure, and
the injection pressure computing means corrects a detection value of the first pressure detecting means by the quantity of pressure variation to compute the injection pressure.

4. A fuel injection controller according to claim 3, wherein the internal combustion engine is a multi-cylinder internal combustion engine having a plurality of fuel injector disposed for each cylinder, which sequentially inject the fuel in a predetermined order, further comprising:
means for detecting pressure of the fuel supplied to the fuel injector of a non-injection cylinder in which no fuel injection is performed,
wherein the second pressure detecting means computes the fuel pressure-feeding pressure by the pressure of the fuel supplied to the fuel injector of the non-injection cylinder.

5. A fuel injection controller according to claim 4, wherein the second pressure detecting means computes the fuel pressure-feeding pressure in consideration of a difference between a fuel path length from the fuel pump to a position where the fuel pressure is measured for the injection cylinder and a fuel path length from the fuel pump to a position where the fuel pressure is measured for the non-injection cylinder.

6. A fuel injection controller according to claim 3, wherein the second pressure detecting means computes the fuel pressure-feeding pressure by an average value of the pressures of the fuel supplied to respective fuel injectors of a plurality of non-injection cylinders.

7. A fuel injection controller according to claim 3, wherein when a specified injection stop condition is satisfied, the
fuel injector stops injecting the fuel to develop a non-fuel injection, and
the second pressure detecting means computes the fuel pressure-feeding pressure in a case of the non-fuel injection and of pressure-feeding the fuel by the fuel pump.

8. A fuel injection controller according to claim 3, wherein the second pressure detecting means computes the fuel not-pressure-feeding pressure on a condition that a pressure variation caused when and after the fuel injector injects the fuel is within an allowable range.

9. A fuel injection controller according to claim 1, further comprising
a fuel pressure sensor disposed downstream of a fuel outlet of the accumulation container in a fuel passage from the accumulation container to an injection port of the fuel injector, wherein
the second pressure detecting means detects the fuel pressure varied when the fuel pump pressure-feeds the fuel on the basis of an output of the fuel pressure sensor.

10. A fuel injection controller according to claim 1, further comprising
a container pressure detecting sensor for detecting pressure in the accumulation container, wherein
the second pressure detecting means detects the fuel pressure varied when the fuel pump pressure-feeds the fuel on the basis of an output of the container pressure detecting sensor.

11. A fuel injection controller for an internal combustion engine that is applied to an accumulator type fuel injection system including an accumulation container for accumulating and holding high-pressure fuel, a fuel pump for pressure-feeding fuel to the accumulation container, and a fuel injector that is disposed in each cylinder of a multi-cylinder internal combustion engine and injects the high-pressure fuel accumulated in the accumulation container, the fuel injection controller comprising:
injection cylinder pressure detecting means that sequentially detects a first fuel pressure varied when the fuel injector injects the fuel in an injection cylinder;
non-injection cylinder pressure detecting means that sequentially detects a second fuel pressure having no variation or a little variation caused when the fuel injector injects the fuel in a non-injection cylinder that is not the injection cylinder; and
injection characteristic computing means that computes an injection characteristic of the fuel injector on the basis of pressure variation data that is a difference between the first fuel pressure detected by the injection cylinder pressure detecting means and the second fuel pressure detected by the non-injection cylinder pressure detecting means, wherein
the first fuel pressure and the second fuel pressure are concurrently detected.

12. A fuel injection controller according to claim 11, wherein
the injection cylinder pressure detecting means and the non-injection cylinder pressure detecting means detect the fuel pressure downstream of a fuel outlet of the accumulation container in a fuel passage from the accumulation container to an injection port of the fuel injector.

13. A fuel injection controller according to claim 11, further comprising
a fuel pressure sensor disposed downstream of a fuel outlet of the accumulation container in a fuel passage from the accumulation container to an injection port of the fuel injector, wherein
the injection cylinder pressure detecting means and the non-injection cylinder pressure detecting means detect fuel pressure in the injection cylinder and fuel pressure in the non-injection cylinder on the basis of an output of the fuel pressure sensor.

14. A fuel injection controller according to claim 11, wherein
the non-injection cylinder pressure detecting means computes fuel pressure in the non-injection cylinder in consideration of a difference between a fuel path length from the fuel pump to a position where the fuel pressure is measured for the injection cylinder and a fuel path length from the fuel pump to a position where the fuel pressure is measured for the non-injection cylinder.

15. A fuel injection controller according to claim 11, wherein
the non-injection cylinder pressure detecting means computes the pressure in the non-injection cylinder by an average value of the fuel pressures in a plurality of non-injection cylinders.

16. A fuel injection controller according to claim 1, wherein
the injection characteristic computing means computes at least any one of an actual injection starting point by the fuel injector, an actual injection finishing point, an injection rate corresponding to a quantity of fuel injected per unit time, a speed of change in the injection rate, a maximum injection rate, which are achieved by the fuel injector, and correlation data relating to these as the injection characteristic.

17. A fuel injection controller according to claim 1, further comprising
learning means for storing the injection characteristic computed by the injection characteristic computing means as a learning value in a storage device, which performs a fuel injection control by use of the learning value.

18. A method of controlling fuel injection for an internal combustion engine that is applied to an accumulator type fuel injection system including an accumulation container for accumulating and holding high-pressure fuel, a fuel pump for pressure-feeding a fuel to the accumulation container, and fuel injectors for injecting the high-pressure fuel accumulated in the accumulation container, the method comprising:
sequentially detecting a first fuel pressure varied when the fuel injector injects the fuel;
sequentially detecting a second fuel pressure varied when the fuel pump pressure-feeds the fuel;
correcting the first fuel pressure based on the second fuel pressure that is detected concurrently with the first fuel pressure when the fuel injector injects the fuel, thereby computing an injection pressure; and
computing an injection characteristic by the fuel injector on the basis of the computed injection pressure, wherein
the first fuel pressure is detected downstream of a fuel outlet of the accumulation container in a fuel passage from the accumulation container to an injection port of the fuel injector, and the second fuel pressure is detected downstream of the fuel outlet of the accumulation container in a fuel passage from the accumulation container to an injection port of another fuel injector.

19. A method of controlling fuel injection for an internal combustion engine that is applied to an accumulator type fuel injection system including an accumulation container for accumulating and holding high-pressure fuel, a fuel pump for pressure-feeding fuel to the accumulation container, and a fuel injector that is disposed in each cylinder of a multi-cylinder internal combustion engine and injects the high-pressure fuel accumulated in the accumulation container, the method comprising:

sequentially detecting a first fuel pressure varied when the fuel injector injects the fuel in an injection cylinder;

sequentially detecting a second fuel pressure having no variation or a little variation caused when the fuel injector injects the fuel in a non-injection cylinder that is not the injection cylinder; and computing an injection characteristic of the fuel injector on the basis of pressure variation data that is a difference between the first fuel pressure and the second fuel pressure, wherein the first fuel pressure and the second fuel pressure are concurrently detected.

\* \* \* \* \*